United States Patent [19]

Hill

[11] 4,077,268
[45] Mar. 7, 1978

[54] GARAGE DOOR OPERATOR

[76] Inventor: John W. Hill, 1350 Graham Rd., Mansfield, Ohio 44903

[21] Appl. No.: 705,294

[22] Filed: Jul. 14, 1976

[51] Int. Cl.$^2$ ............................................. F16H 27/02
[52] U.S. Cl. .................................... 74/89.15; 160/188
[58] Field of Search ................ 74/89.15, 424.8 R, 25; 160/188

[56] References Cited

U.S. PATENT DOCUMENTS

| 2,882,045 | 4/1959 | Moore | 160/188 |
| 2,883,183 | 4/1959 | Finsterwalder et al. | 74/89.15 |
| 3,475,705 | 10/1969 | Lindemann | 74/89.15 |

Primary Examiner—Samuel Scott
Assistant Examiner—Wesley S. Ratliff, Jr.
Attorney, Agent, or Firm—Brown, Murray, Flick & Peckham

[57] ABSTRACT

A long horizontal tubular housing for a garage door operating screw is provided in its bottom with a slot extending lengthwise of the housing. Inside the housing there is a metal tube that is several feet long and that can be rotated by reversible means at one end of the housing. Wound helically around the tube and welded to it is a wire that forms a screw thread that is spaced from the surrounding tube and is encircled by a traveling nut for movement lengthwise of the housing when the tube is rotated. The nut is connected to means extending down through the slot for connection to a garage door to open or close the door. Since the space between the screw thread and the surrounding housing is empty except for the nut, the wire-wound portion of the tube is unsupported between the nut and the bearings for the tube. However, due to the light weight of the screw, it can be driven at least as fast as conventional door-opening screws without bending.

2 Claims, 3 Drawing Figures

GARAGE DOOR OPERATOR

The way of opening an overhead garage door is by means of a horizontal traversing screw suspended from a garage ceiling and extending away from the door. When the screw is rotated by an electrical motor, a threaded member traveling along the screw moves links or arms attached to the door to open it. Since the screw is several feet long and of small diameter, the practice has been to support it substantially throughout its length because its critical speed of rotation is quite low. The critical speed of such a screw is the speed at which the centrifugal force of the revolving shaft, already slightly deflected by gravity, is just sufficient to overcome the resistance forces of the screw material, so that as the centrifugal force increases with deflection of the screw, the screw eventually swings or whips around considerably bent.

It is among the objects of this invention to provide a garage door operator having a traversing screw which has a considerably higher critical speed than those known heretofore, and which requires no support between its bearings.

The preferred embodiment of the invention is illustrated in the accompanying drawings, in which FIG. 1 is a central longitudinal vertical section, partly broken away, of the operator;

Figure 1:
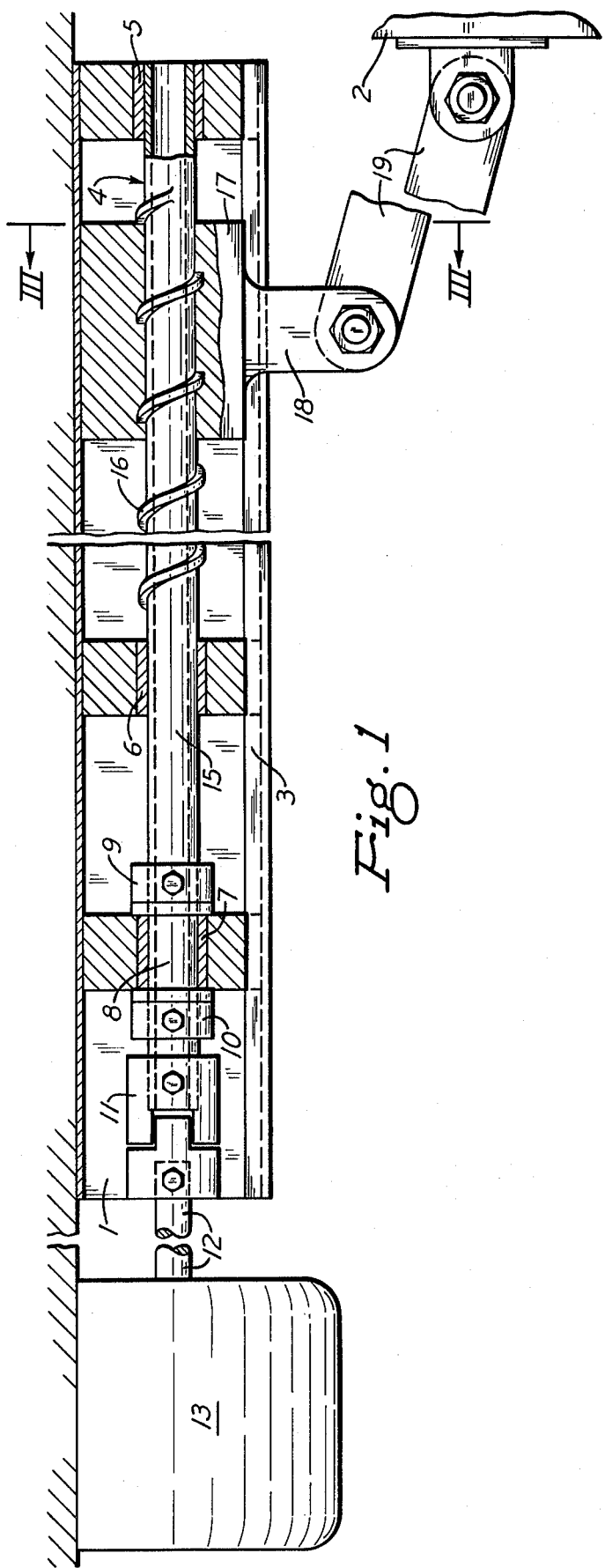
Figure 2:
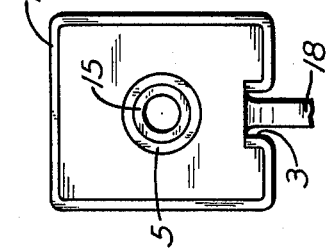
FIG. 2 is a view of the door end of the operator.
Figure 3:
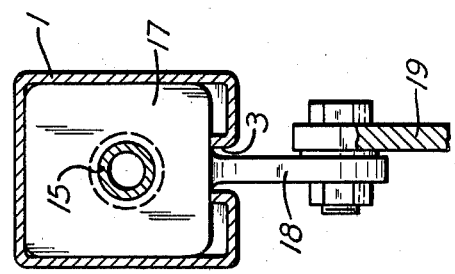
FIG. 3 is a vertical section taken on the line III-III of FIG. 1.

Referring to the drawings, a long tubular housing 1 is rigidly suspended in any suitable manner from the ceiling of a garage, in which it extends inwardly away from the garage door 2. The door, of course, is the overhead type that either travels upwardly in tracks or is swung upwardly on pivots. The housing shown is rectangular, which is preferred, but it could be round or some other shape. The bottom of the housing is slit lengthwise and the sides of the slit are bent upwardly in parallel relation a short distance to form the side walls of a longitudinal slot 3. Inside the housing there is a long screw 4, one end of which is supported in a bearing 5 mounted in the door end of the housing. About seven feet or more from this bearing there is another bearing 6 in the housing for supporting the opposite end portion of the screw. Between this bearing and the adjacent end of the tubular housing there is a third bearing 7, in which a short shaft 8 is rotatably mounted. A collar 9 on one end of the shaft is attached to the adjoining end of the screw, while a collar 10 at the other end is attached to the shaft of a flexible coupling 11. The coupling is connected to the shaft 12 of a reversible electric motor 13.

In accordance with this invention, the screw is not a conventional solid screw that has a relatively low critical speed and that must be supported throughout its length to permit it to be operated above its critical speed. Instead, the major portion of the screw is formed from a metal tube 15 that weighs considerably less than a solid screw of comparable size. To provide a screw thread, a wire 16 is wrapped or wound in a helical manner around the tube in the desired position and is welded to the tube. The wire may take different shapes, but a rectangular wire is preferred because it is easier to wrap around the tube in the desired manner.

Surrounding a short length of the screw is a traveling nut 17 that is moved lengthwise of the tubular housing when the screw is turned. Preferably, the nut is the same shape as the housing and slides along the upper wall and the side walls of the housing. The bottom of the nut slides along the upper edges of the side walls of the housing slot. Rigidly connected to the bottom of the nut and extending down through the slot is a lug 18, to the lower end of which one end of a link 19 or arm is pivotally connected. This arm extends out to the garage door, to which it is connected in such a manner that when the nut moves toward the motor end of the screw the door will be raised and when the nut moves in the opposite direction, the door will be closed.

An advantage of this particular screw is that it is cheaper than a solid screw that has to be ground in order to form the screw thread, but the big advantage is that since the screw is considerably lighter in weight than a solid screw the critical speed of the hollow screw is higher so that it does not need to be supported between its bearings by the tubular housing when driven at the same speed as, or somewhat faster than, solid screws. Also, since the traveling nut 17 surrounds the screw, there is no danger of the nut jamming on the screw as sometimes happens with threaded blocks that engage only the lower portions of screws in door operators. When the nut is at the central portion of the screw it forms a bearing that would restrain any tendency of the screw to bend even if the screw were solid, but as the nut approaches either end of the screw the unsupported length of the screw becomes so great that it would deflect if it were not made as disclosed herein. A further advantage of this invention is that the housing for the screw can be a simple, lightweight, tubular member of inexpensive construction as contrasted with the specially made housings used heretofore, in which the screws had to be supported throughout their length. In forming the screw thread by welding the helical wire around the tubular body of the screw, the tube is reinforced by the wire and made considerably stronger. There also is a large bearing area between the screw and the traveling nut encircling it.

According to the provision of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A garage door operator comprising a horizontal tubular housing provided in its bottom with a slot extending lengthwise thereof, a metal tube several feet long inside said housing extending lengthwise thereof above said slot, bearings in the housing supporting the opposite ends of said tube, reversible means at one end of said housing for rotating the tube, a wire wound helically around the tube and welded thereto to form a screw thread between said bearings, said screw thread being spaced from the surrounding tube, a traveling nut encircling said tube and thread for movement lengthwise of said housing when the tube is rotated, and means connected to the nut and extending down through said slot for connection to a garage door to open or close the door when the nut is moved along said tube, the space between said screw thread and surrounding housing being empty except for said nut, whereby the wire-wound portion of the tube is unsupported between said nut and bearings.

2. A garage door operator according to claim 1, in which said tubular housing is rectangular in cross section with the side walls of said slot extending upwardly, and said nut is rectangular and slidably engages the inner surfaces of the top and sides of the tubular housing and the upper edges of said slot side walls.

* * * * *